(12) United States Patent
Lugo et al.

(10) Patent No.: US 12,133,134 B2
(45) Date of Patent: Oct. 29, 2024

(54) SYSTEMS AND METHODS FOR CONTROLLING AN OPERATION OF AN ATTRACTION SYSTEM

(71) Applicant: Universal City Studios LLC, Universal City, CA (US)

(72) Inventors: Victor Alexander Lugo, Belle Isle, FL (US); Daniel Matthew Freedman, Orlando, FL (US); Asli Soyler Akbas, Orlando, FL (US); James Anderson, Orlando, FL (US); Jared Cryder, Orlando, FL (US); Robert Jordan, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 262 days.

(21) Appl. No.: 17/462,851

(22) Filed: Aug. 31, 2021

(65) Prior Publication Data

US 2022/0174451 A1    Jun. 2, 2022

Related U.S. Application Data

(60) Provisional application No. 63/120,045, filed on Dec. 1, 2020.

(51) Int. Cl.
*H04W 4/021* (2018.01)
*A63G 31/00* (2006.01)
(Continued)

(52) U.S. Cl.
CPC ............ *H04W 4/021* (2013.01); *A63G 31/00* (2013.01); *G01C 21/3629* (2013.01); *H04W 4/025* (2013.01); *H04W 4/029* (2018.02)

(58) Field of Classification Search
CPC ......... H04W 4/029; H04W 4/02; H04W 4/33; H04W 4/021; H04W 4/30; H04W 4/80;
(Continued)

(56) References Cited

U.S. PATENT DOCUMENTS 7,620,493 B2  11/2009  Stankiewicz et al.
8,577,602 B2  11/2013  Walder
(Continued)

FOREIGN PATENT DOCUMENTS

EP    3469803 A1    4/2019

OTHER PUBLICATIONS

Kammoun, S. et al., "Guiding Blind People with Haptic Feedback," Conference: Pervasive 2012 Workshop on Frontiers in Accessibility for Pervasive Computing, Jan. 2012, 4 Pages, https://www.researchgate.net/publication/235005436.

(Continued)

*Primary Examiner* — Kwasi Karikari
(74) *Attorney, Agent, or Firm* — Fletcher Yoder, P.C.

(57) ABSTRACT

An attraction system has a plurality of show effects, a handheld or wearable device, and a control system. The control system is configured to perform operations that include monitoring a parameter of the handheld or wearable device, determining that the parameter is indicative of an undesirable utilization of the attraction system, and controlling the handheld or wearable device, at least one show effect of the plurality of show effects, or both. The control system is also configured to provide guidance to change the parameter in response to the determination that the parameter is indicative of the undesirable utilization of the attraction system.

20 Claims, 4 Drawing Sheets

(51) Int. Cl.
*G01C 21/36* (2006.01)
*H04W 4/02* (2018.01)
*H04W 4/029* (2018.01)

(58) Field of Classification Search
CPC ..... H04W 4/024; H04W 4/026; H04W 12/08; H04W 12/64; H04W 64/00; H04W 4/50; H04W 88/02
See application file for complete search history.

(56) References Cited

U.S. PATENT DOCUMENTS

| | | | |
|---|---|---|---|
| 8,731,817 B2 | 5/2014 | Ballew et al. | |
| 9,014,509 B2 | 4/2015 | Fedorovskaya et al. | |
| 9,014,510 B2 | 4/2015 | Fedorovskaya et al. | |
| 9,470,532 B2 | 10/2016 | Pellow et al. | |
| 9,491,584 B1 | 11/2016 | Mendelson | |
| 10,614,271 B2 | 4/2020 | Cossairt et al. | |
| 10,699,084 B2 | 6/2020 | Yeh et al. | |
| 10,845,975 B2 | 11/2020 | Vyas et al. | |
| 2011/0105092 A1* | 5/2011 | Felt | H04W 4/021 455/414.1 |
| 2011/0187642 A1* | 8/2011 | Faith | G06Q 20/3224 345/158 |
| 2012/0235812 A1* | 9/2012 | Maia | G01S 13/08 340/539.11 |
| 2013/0143651 A1* | 6/2013 | Harrison | H04W 12/50 463/31 |
| 2019/0201806 A1 | 7/2019 | Weston | |
| 2019/0332834 A1 | 10/2019 | Yeh et al. | |

OTHER PUBLICATIONS

PCT/US2021/060991 International Search Report and Written Opinion mailed Mar. 7, 2022.

* cited by examiner

SYSTEMS AND METHODS FOR CONTROLLING AN OPERATION OF AN ATTRACTION SYSTEM

CROSS REFERENCE TO RELATED APPLICATION

This application claims priority from and benefit of U.S. Provisional Application No. 63/120,045, filed Dec. 1, 2020, entitled "SYSTEMS AND METHODS FOR CONTROLLING AN OPERATION OF AN ATTRACTION SYSTEM," which is hereby incorporated by reference in its entirety for all purposes.

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

Amusement parks typically include various attractions that provide unique experiences for guests. For example, an amusement park may include various rides and show performances. As technology has continued to improve, such attractions have increased in sophistication and complexity. There is a corresponding increase in expectations regarding entertainment quality of attractions. Further, attractions are providing more options for user interaction and user choice. This can result in user's misalignment with expected interactions and/or expected progress through an attraction during certain timeframes. As a result, improved and more creative attractions and techniques for aligning experiences with expectations are needed.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an attraction system has a plurality of show effects, a handheld or wearable device, and a control system. The control system is configured to perform operations that include monitoring a parameter of the handheld or wearable device, determining that the parameter is indicative of an undesirable utilization of the attraction system, and controlling the handheld or wearable device, at least one show effect of the plurality of show effects, or both. The control system is then configured to provide guidance to change the parameter in response to the determination that the parameter is indicative of the undesirable utilization of the attraction system.

In an embodiment, a control system for an attraction system includes processing circuitry and a memory having instructions. The instructions, when executed by the processing circuitry, are configured to cause the processing circuitry to perform operations that include identifying an interaction between a handheld or wearable device of the attraction system and a show effect of a plurality of show effects of the attraction system, controlling the handheld or wearable device, the show effect, or both, in response to identification of the interaction between the handheld or wearable device and the show effect, and monitoring a parameter of the handheld or wearable device, identifying an undesirable interaction between a user and the attraction system based on the parameter. The instructions, when executed by the processing circuitry, are also configured to cause the processing circuitry to perform operations that include controlling the handheld or wearable device and the show effect to provide guidance to change the parameter associated with the undesirable interaction in response to the identification of the undesirable interaction between the user and the attraction system.

In an embodiment, an attraction system includes a show effect of a plurality of show effects, a handheld or wearable device, and a control system. The control system is configured to perform operations that include identifying an interaction between the handheld or wearable device and the show effect, controlling the handheld or wearable device, the show effect, or both, in response to identification of the interaction between the handheld or wearable device and the show effect, and detecting an undesirable parameter associated with the handheld or wearable device in which the undesirable parameter is indicative of an undesirable location of the handheld or wearable device, an undesirable usage of the handheld or wearable device, or both. The control system is also configured to control the handheld or wearable device and the show effect to provide guidance that is integrated with effects being provided by other show effects of the plurality of show effects in response to the detection of the undesirable parameter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
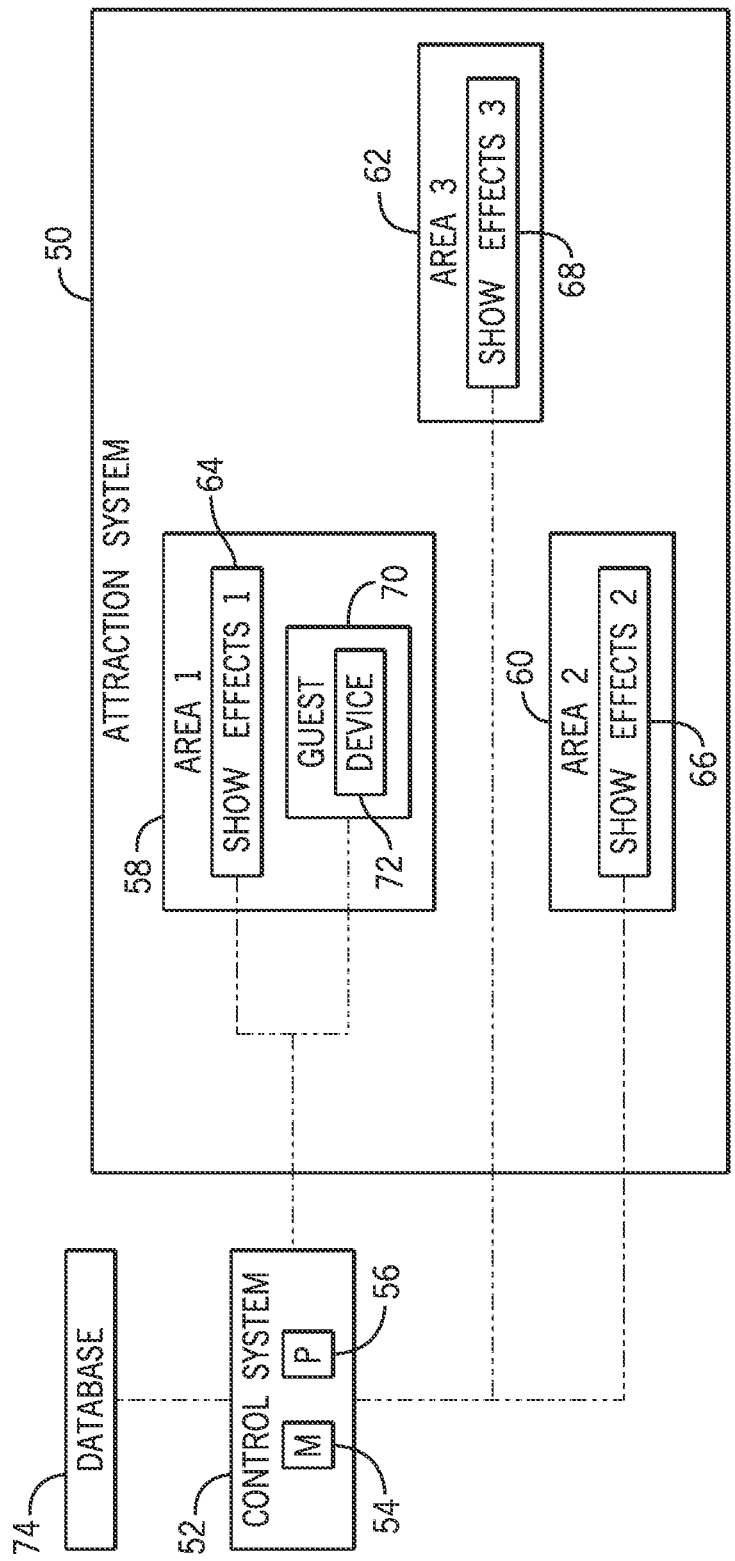
FIG. 1 is a schematic diagram of an embodiment of an attraction system having multiple areas through which guests may be directed, in accordance with an aspect of the present disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure is related to an attraction system, such as an attraction system for an amusement park. The attraction system may include different areas having various show effects, such as lighting, sound devices, animated figures, video interactions, virtual reality devices, augmented reality devices, actuation elements (e.g., decorations configured for actuation), flame generators, water pumps, fog machines, airflow generators, and so forth. Guests of the amusement park may be directed through the different areas and may experience the show effects. In one embodiment, the guests may be able to interact with some of the show effects. For example, each guest may have an attraction device that may be used to cause one of the show effects to be activated.

In some circumstances, it may be difficult to direct the guests to experience the attraction system in a desirable manner. For example, guests may not timely travel through the different areas of the attraction system and/or may not use the attraction device correctly to interact with show effects of the attraction system. As a result, guests may not fully experience the attraction system, and/or a worker associated with the attraction system may be needed to assist or guide the guests during operation of the attraction system. In any case, the experience of the guest may be impacted, such as by reducing an immersion of the guest within the environment of the attraction system.

Thus, it is presently recognized that a system and method for facilitating interaction between the guests and the attraction system may improve the experience of guests. Embodiments of the present disclosure are directed to controlling elements of the attraction system, such as the attraction device and/or the show effects, to help direct the guests through the attraction system. By way of example, a control system of the attraction system may monitor a parameter associated with the guests to determine whether the guests are interacting with the attraction system in a desirable manner. The parameter may be indicative of how a guest is moving through the different areas, how a guest is using an attraction device, and the like. In response to a determination that a monitored parameter is indicative of an undesirable interaction between the guest and the attraction system (e.g., an undesirable location of the guest, an undesirable usage of the attraction device, and/or undesirable utilization of the attraction system), the control system may actuate the attraction device of the guest and/or a show effect in the area in which the guest is located to help the guest. For instance, the control system may cause the attraction device and/or the show effects to provide instructions regarding navigation through the different areas of the attraction system and/or instructions for using the attraction device. In this manner, the control system may operate the attraction system to help the guest without the need for a worker of the attraction system to intervene. As such, the attraction system may provide a more immersive and/or personalized experience for the guest, resulting in a more thorough and efficient guest experience. Indeed, present embodiments integrate existing aspects of show effects and coordination with attraction devices to seamlessly provide specific guidance to individual users based on location data and user data without substantially interfering with or breaking immersion in the attraction experience. As discussed further below, this is accomplished by, for example, selecting specific show elements and characteristics for presentation of guidance (e.g., incentive-based guidance) based on observed data associated with amusement device operation and location within a particular attraction (e.g., area within an attraction).

With the preceding in mind, FIG. 1 is a schematic diagram of an embodiment of an attraction system 50, which may be a part of an amusement park. For instance, the attraction system 50 may include an interactive game, a theatric show, another suitable type of attraction system, or any combination thereof. The attraction system 50 may include or be communicatively coupled to a control system 52 (e.g., an electronic controller) configured to control operations of certain features of the attraction system 50. To this end, the control system 52 may include a memory 54 and processing circuitry 56, such as a microprocessor. The memory 54 may include one or more of a volatile memory, such as random access memory (RAM), and/or non-volatile memory, such as read-only memory (ROM), optical drives, hard disc drives, solid-state drives, or any other tangible, non-transitory, computer-readable medium that includes executable instructions to operate the attraction system 50. The processing circuitry 56 may include one or more application specific integrated circuits (ASICs), one or more field programmable gate arrays (FPGAs), or any combination thereof, configured to execute the instructions stored in the memory 54.

For example, the attraction system 50 may include different areas, such as a first area 58, a second area 60, and a third area 62. Each area 58, 60, 62 may be a volume of space separated from one another within the attraction system 50, such as via walls, partitions, markings, and the like. For instance, each area 58, 60, 62 may be a room, a queueing section, an elevator, a people mover, an interactive space, a theatre, a ride environment, a ride vehicle, and the like, of the attraction system 50. Each of the areas 58, 60, 62 may also include respective show effects for providing entertainment for guests of the attraction system 50. That is, the first area 58 may include first show effects 64 that provide entertainment for guests located in the first area 58, the second area 60 may include second show effects 66 that provide entertainment for guests located in the second area 66, and the third area 62 may include third show effects 68 that provide entertainment for guests located in the third area 62. The control system 52 may be communicatively coupled to each of the show effects 64, 66, 68 and may control the show effects 64, 66, 68 to provide entertainment for guests that are in the different areas 58, 60, 62. By way of example, the control system 52 may control the show effects 64, 66, 68 to provide a visual output (e.g., lighting), provide an audio output (e.g., sounds), change a position of a prop (e.g., an animated figure), and so forth, to provide entertainment for the guests. Although the illustrated attraction system 50 includes three areas 58, 60, 62 that each include separate show effects 64, 66, 68, an additional or alternative attraction system 50 may include a different number of areas (e.g., one area, two areas, more than three areas) and/or a different arrangement of show effects, such as show effects that may be shared between multiple areas and/or areas that may not include any show effects controlled by the control system 52. Further, the control system 52 may be representative of multiple controllers that communicate to coordinate show effects in a single area or between areas.

In an embodiment, guests of the attraction system 50 may be able to interact with the show effects 64, 66, 68. As an example, a guest or a user 70 may possess and/or be associated with an attraction device 72, which may be a handheld device and/or a wearable device that the guest 70 may carry to the different areas 58, 60, 62. In the illustrated embodiment, the guest 70 is located in the first area 58 and is able to use the attraction device 72 to interact with the first show effects 64. In an additional or an alternative embodiment, the guest 70 may interact with one of the other show effects 66, 68, such as by navigating to the second area 60 and/or the third area 62 and/or while remaining in the first area 58. For example, the attraction device 72 may include a radio-frequency identification tag, a barcode, a signal emitter, or the like that cooperates with the control system 52 (e.g., a camera of the control system) to facilitate detection of relative positioning or movements of the attraction device 72 and initiation of show effects based on such detection. Thus, the guest 70 may use the attraction device 72 to cause the control system 52 to actuate one of the first show effects 64, such as based on an orientation of the attraction device 72 (e.g., facing or pointing of the attraction device 72 at one of the first show effects 64). In response, the control system 52 may control the attraction system 50 based on the interactions associated with the guest 70 to provide an interactive experience for the guest 70. Indeed, the control system 52 may control (e.g., activate, modify, actuate) the show effects 64, 66, 68 to provide different experiences for different guests, such as by providing an output that may be based on the interaction between the guest 70 and the attraction system 50 and/or based on an identifier (e.g., of the guest 70, of the attraction device 72), thereby creating a unique experience for the guest 70.

In an embodiment, the control system 52 may also control other aspects associated with the attraction system 50 based on the interaction between the guest 70 and the attraction system 50. By way of example, the control system 52 may be communicatively coupled to a database 74. The database 74 may store different information, and the control system 52 may update the information stored in the database 74 based on the interaction between the guest 70 and the attraction system 50. For instance, the database 74 may store a quantity of points that are associated with the guest 70 (e.g., a user profile of the guest 70), and the control system 52 may instruct the database 74 to update the quantity of points, such as by increasing or decreasing the quantity of points, based on the interactions between the guest 70 and the attraction system 50. The points may be used to provide a gamification experience of the attraction system 50. The control system 52 may additionally or alternatively operate the attraction system 50 based on the quantity of points stored in the database 74, such as by actuating one of the show effects 64, 66, 68 in a particular manner, and further providing a unique experience for the guest 70.

Additionally or alternatively, the guest 70 may interact with the attraction system 50 without the use of the attraction device 72. For example, the control system 52 may be configured to detect certain movement and/or gestures (e.g., hand waving) made by the guest 70, and the control system 52 may control the show effects 64, 66, 68, communicate with the database 74, and so forth, based on such movement, such as based on the movement matching a target movement. Indeed, different detected movement may cause the control system 52 to actuate the show effects 64, 66, 68 in different manners and/or to instruct the database 74 to update in different ways to provide a unique experience for the guest 70.

Figure 2:
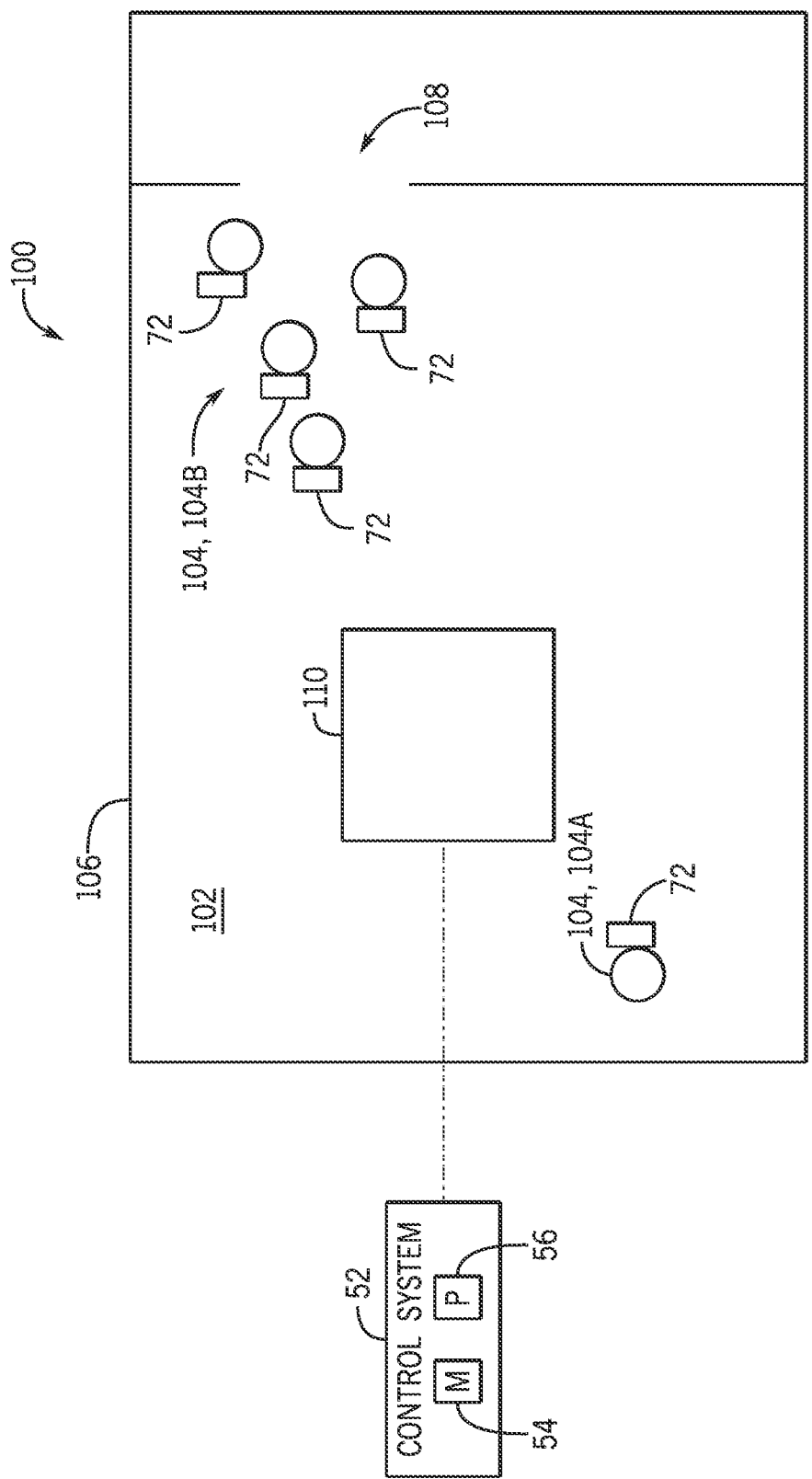
FIG. 2 is a schematic overhead view of an area incorporated in an attraction system, in accordance with an aspect of the present disclosure.

FIG. 2 is a schematic diagram of an embodiment of an area 100 of the attraction system 50 of FIG. 1, which may be representative of any or multiple of the areas 58, 60, 62. The area 100 includes a space 102 in which guests 104 may navigate during operation of the attraction system. For instance, the area 100 may include an enclosure 106 (e.g., walls) and at least one opening 108 that enables the guests 104 to transition into or out of the enclosure 106 to enter or exit the space 102, respectively. In an additional or an alternative embodiment, the area 100 may not include the enclosure 106, and the space 102 may be open to enable the guests 104 to enter or exit the area 100 at any suitable section of the space 102. A show effect 110 (e.g., lighting, a sound device, a robot, a special effect prop) may also be disposed within the space 102. The guests 104 may interact with the show effect 110, such as via their respective attraction devices 72, and the control system 52 may control the show effect 110 based on such interactions to entertain the guests 104 within the space 102.

In the illustrated area 100, a guest 104A may be separated from a group of guests 104B. For instance, the group of guests 104B may be exiting the space 102 to enable a different group of guests to enter the space 102, such as based on a duration for which the guests 104 have been located within the area 100 exceeding a threshold amount of time. However, unlike the guests 104B, the guest 104A may not be exiting the space 102 as desired. For this reason, it may be desirable to guide the guest 104A to exit the space 102. By way of example, the control system 52 may monitor the location of each guest 104 within the space 102 (e.g., based on a location of the attraction devices 72 possessed by the guests 104) and may determine that the guest 104A is not moving toward the opening 108 to exit the space 102 at a desired time. As a result, the control system 52 may operate the attraction device 72 associated with the guest 104, the show effect 110, and/or another feature of the area 100 in order to guide the guest 104A toward the opening 108. Indeed, the control system 52 may determine a current location of the attraction device 72 within the attraction system (e.g., within the space 102), and the control system 52 may control various features proximate to the attraction device 72 so as to direct the guest 104A from the current location out of the space 102. For example, animated figures may be actuated to provide instructions (e.g., motions signals or verbal output) and/or virtual characters may be presented that signal or verbalize guidance. Thus, the control system 52 may operate the area 100 to guide the guests 104 out of the spaces 102 without having a worker intervene. As a result, the control system 52 may continue to provide an immersive experience for the guests 104 while also guiding the guests through the attraction system in a desirable manner. This may include providing in-game incentives to move to a certain location (e.g., instructions to progress to the next room to gain points). The control system 52 may additionally or alternatively provide disincentives for remaining at a location so as to motivate movement in a desired flow (e.g., instructions to progress to the next room or lose 20 points). Indeed, the instructions may be integrated with other effects and/or interactions that are provided by the attraction system (e.g., by the attraction devices 72, by the show effect 110) such that the instructions are presented seamlessly and in a congruous manner to maintain the immersive experience provided to the guests 104.

As described herein, the control system 52 may additionally or alternatively monitor other parameters associated with an interaction between the guests 104 and the area 100. For example, the control system 52 may monitor a usage of the attraction devices 72 by the guests 104, and the control system 52 may detect an occurrence of any undesirable usages, such as incorrectly using the attraction device 72 to interact with the show effect 110, an absence of using the attraction device 72 when usage is expected, undesirable movement of the attraction device 72 (e.g., indicating that a guest 104 is exiting the attraction system with the attraction device 72), and the like. The control system 52 may then control the attraction system (e.g., the attraction device 72 itself) to guide the guest to use the attraction device 72 desirably, such as by providing instructions associated with how the guest should use the attraction device 72 correctly.

Figure 3:
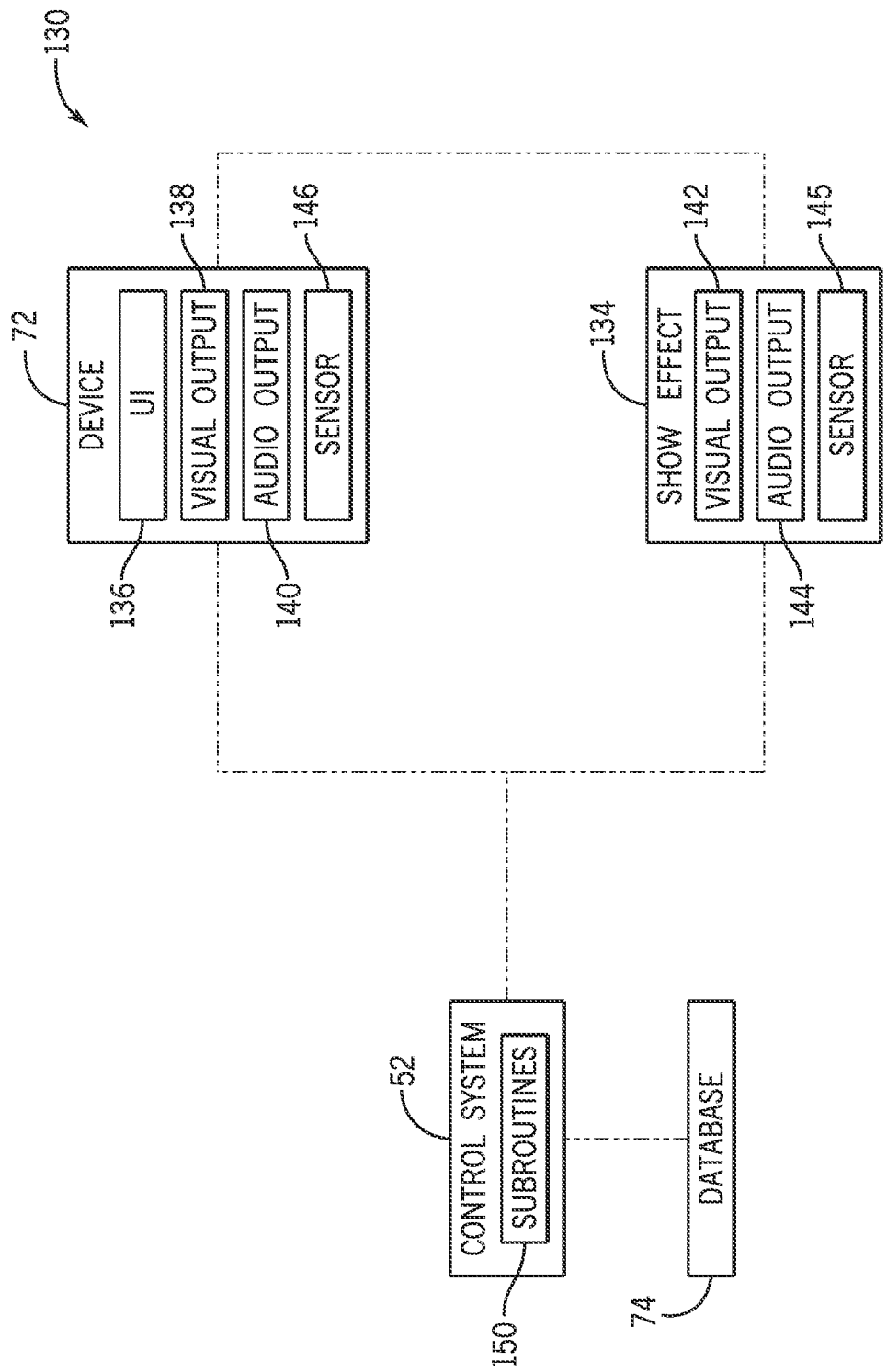
FIG. 3 is a schematic diagram of an embodiment of a communication network between a control system, an attraction device, and a show effect of an attraction system, in accordance with an aspect of the present disclosure.

FIG. 3 is a schematic diagram of an embodiment of a communications network 130 in which the control system 52, the attraction device 72, and a show effect 134 (e.g., any of the show effects 64, 66, 68, 110) are communicatively coupled to one another. The illustrated attraction device 72 includes a user interface 136 with which a guest may interact to actuate different features of the attraction device 72. For example, the user interface 136 may include a touch screen, a button, a knob, a switch, a dial, another suitable component, or any combination thereof. The attraction device 72 may also include a visual output component 138, such as a light or a display, and an audio output component 140, such as a speaker. Interaction with the user interface 136 may cause actuation of the visual output component 138 (e.g., to present a particular visual output or image) and/or of the audio output component 140 (e.g., to output a sound). As an example, the attraction device 72 may include a themed toy (e.g., a toy laser shooter, a toy wand, a bracelet, a toy sword) that facilitates interaction with the environment via wireless signals (e.g., radio signals, light emissions, audio signals, location tracking).

The show effect 134 may also include a visual output component 142 and an audio output component 144. The visual output component 142 and/or the audio output component 144 may be actuated in order to entertain guests. By way of example, the visual output component 142 and/or the audio output component 144 may be controlled based on actuation of the user interface 136 of the attraction device 72, thereby providing an interactive experience in which the guest may cause the show effect 134 to be actuated based on manipulation of the attraction device 72. Indeed, the control system 152 may actuate aspects of the show effect 134 in response to identification of an interaction between the attraction device 72 and the show effect 134. In an example, the interaction between the attraction device 72 and the show effect 134 may include a physical contact between the attraction device 72 and the show effect. Additionally or alternatively, the attraction device 72 may be configured to output a signal (e.g., an infrared signal, a laser), such as based on an interaction with the user interface 136, and the show effect 134 may include a sensor 145 configured to receive the signal. Thus, the interaction between the attraction device 72 and the show effect 134 may include a receipt of the signal (e.g., as detected by the sensor 145) transmitted by the attraction device 72.

Further still, an interaction between the attraction device 72 and the show effect 134 may be identified based on other indications, such as based on a parameter (e.g., a positioning) of the attraction device 72 when the user interface 136 is actuated, based on a parameter (e.g., a positioning, an operation) of the show effect 134 when the user interface 136 is actuated, based on a location of the attraction device 72 relative to the show effect 134, another suitable parameter, or any combination thereof. Indeed, the attraction device 72 may also include a sensor 146 that may transmit sensor data indicative of a parameter of the attraction device 72, and the control system 52 may use the sensor data received from the sensor 145 of the show effect 134, the sensor 146 of the attraction device 72, or both, to identify the interaction between the attraction device 72 and the show effect 134. In any case, the control system 52 may cause the show effect 134 to present a visual output, present an audio output, adjust positions, or any combination thereof, based on various sensor data received from the attraction device 72, the show effect 134, or both. To this end, the control system 52 may store subroutines 150 (e.g., stored within the memory of the control system 52) that may be executed to control the attraction device 72, the show effect 134, or both, based on various criteria associated with received sensor data.

In an embodiment, the sensor 146 may monitor a location of the attraction device 72, such as a location within an area of the attraction system. For instance, the sensor 146 may use ultra-high frequency transmissions for communicating the location of the attraction device 72 to the control system 52. The control system 52 may determine whether the attraction device 72 is located in a desirable area via the sensor data received from the sensor 146. By way of example, the control system 52 may also monitor a time associated with an attraction experience, determine an expected location of the attraction device 72 based on the associated time, and determine whether a current location of the attraction device 72 indicated by the sensor 146 matches with the expected location (e.g., is in a location range). If the detected location of the attraction device 72 is not within a threshold of the expected location, steps may be taken to encourage the user to move the attraction device 72 to the desired location via control of the show effect 134 and/or the attraction device 72.

In an additional or an alternative embodiment, the sensor 146 may indicate a usage of the attraction device 72. For instance, the sensor 146 (e.g., a gyroscope, an accelerometer) may monitor an orientation and/or a movement of the attraction device 72, and the control system 52 may determine whether the orientation and/or the movement is undesirable based on sensor data received from the attraction device 72. Indeed, based on the sensor data, the control system 52 may determine whether the guest is holding the attraction device 72 correctly, whether the attraction device 72 is facing the show effect 134 (e.g., during actuation of the user interface 136), and the like. Additionally or alternatively, the sensor 146 may indicate a user interaction with the user interface 136, such as an occurrence of the guest actuating (e.g., pressing, turning, selecting, tapping, operating, activating) the user interface 136. By way of example, the control system 52 may receive sensor data from the sensor 146 to determine a frequency of actuation of the user interface 136, a time associated with actuation of the user interface 136, an orientation and/or a position associated with the attraction device 72 and/or the show effect 134 during actuation of the user interface 136, and so forth. The control system 52 may therefore determine whether the guest is interacting with the user interface 136 in a desirable manner to determine whether the guest is using the attraction device 72 desirably.

Based on a determination that the guest is not interacting with the attraction system in a desirable manner, the control system 52 may control the attraction device 72 and/or the show effect 134 accordingly. As an example, the control system 52 may actuate certain features of the attraction device 72 to direct or guide the guest to a different area (e.g., an expected location) within the attraction system based on a determination that the current location of the attraction device 72 is undesirable (e.g., the current location does not match with the expected location). As another example, the control system 52 may cause the attraction device 72 to provide guidance or instructions to correct the usage of the attraction device 72, such as by indicating a desirable orientation (e.g., a manner of holding) of the attraction device 72 and/or a desirable manner or time in which the user interface 136 is to be actuated. Indeed, the control system 52 may control the visual output component 138 to present a visual output (e.g., text instructions), the audio output component 140 to present an audio output (e.g., spoken words), another suitable feature to present a different type of output (e.g., a component to provide haptic feedback), to provide such guidance or instructions. Each of these may be done separately or in coordination with control of the show effect 134, which may include multiple show effects. For instance, the control system 52 may determine a location of the attraction device 72 (e.g., based on sensor data received from the sensor 145) and may actuate the show effect 134 (e.g., display an animation in a location that is viewable from the location of the attraction device 72) based on a detection of an undesirable parameter associated with the attraction device 72 and also based on a determination that the show effect 134 is proximate to the attraction device 72. The control system 52 may then operate the visual output component 142 and/or the audio output component 144 of the show effect 134 to provide instructions to direct the guest and/or to correct the usage of the attraction device 72. For example, a themed character in an animation or a themed animated robot may provide instructions and/or demonstrate how to properly utilize the attraction device 72. In a further embodiment, the sensor 145 may transmit sensor data indicative of a positioning of the show effect 134, such as of a prop associated with the show effect, and the control system 52 may control the show effect 134 based on the positioning. By way of example, the prop may include an arrow, the sensor data transmitted by the sensor 145 may indicate an orientation of the arrow, and the control system 52 may adjust the positioning of the arrow to point toward a location where the guest is to navigate (e.g., to direct the guest to a different area within the attraction system) or demonstrate how the user should employ the attraction device 72, which may have a form factor of a similar arrow.

Each of FIGS. 4 and 5 described below illustrates a method of controlling an attraction system. In one embodiment, each of the methods may be performed by a single respective component, such as by the processing circuitry 56. In an additional or an alternative embodiment, multiple components may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such as at the same time and/or in response to one another.

Figure 4:
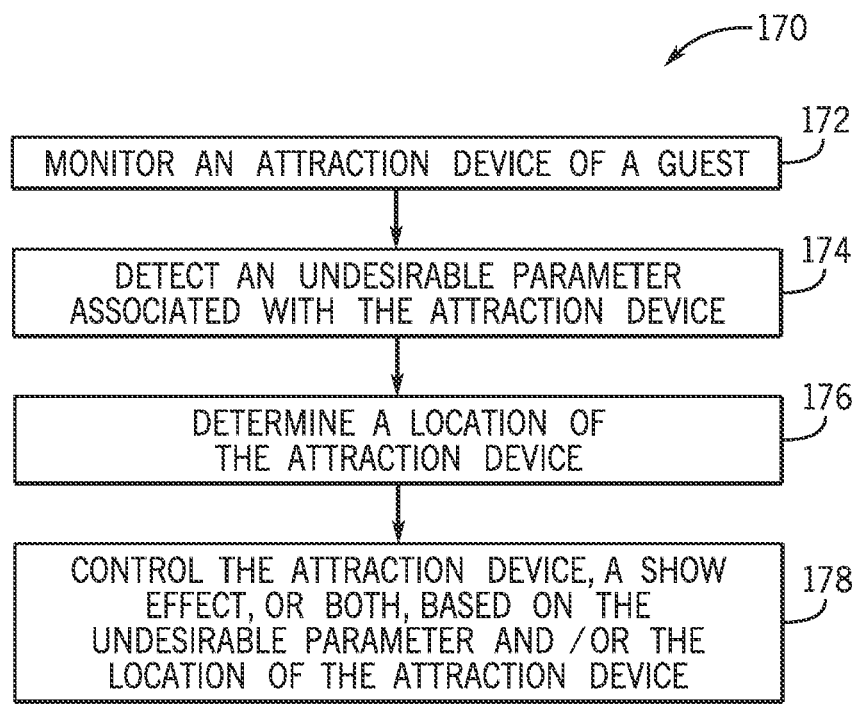
FIG. 4 is a flowchart of an embodiment of a method for controlling an attraction system based on a location and an undesired parameter of an attraction device, in accordance with an aspect of the present disclosure.

FIG. 4 is a flowchart of an embodiment of a method 170 for controlling an attraction system based on detection of an undesirable parameter associated with an attraction device of a guest, which may include detection of the attraction device in an undesired location, detection of improper use of the attraction device, or the like. At block 172, the attraction device is monitored. For example, the attraction device may include a sensor, and sensor data from the sensor may be received for processing by a controller. In another embodiment, block 172 may include receiving (e.g., at a controller) emissions or associated data from an emitter of the attraction device to determine information about the attraction device. At block 174, an undesirable parameter associated with the attraction device is detected based on analysis of the sensor data, data from the emitter, or the like. As previously noted, the undesirable parameter may be indicative of the guest interacting with the attraction system in an undesirable manner or another suitable undesirable utilization of the attraction system.

At block 176, in response to detecting the undesirable parameter, a location of the attraction device may be determined or confirmed, such as based on additional sensor data received from the sensor of the attraction device, another sensor of the attraction device, or a sensor otherwise associated with the attraction system (e.g., a camera located in a room of an attraction). At block 178, the attraction device, a show effect, or both, may be controlled based on the detected undesirable parameter and/or the location of the attraction device to address the undesirable parameter. As an example, the attraction device may be controlled to provide instructions or guidance, such as by providing a visual output, an audio output, haptic feedback, and the like. Further, operational features (e.g., interactive communication features, such as a laser emitter) of the attraction device may be disabled until a desired position is reached. As another example, the show effect, which may have been determined to be proximate to the attraction device, may be controlled to provide the instructions, such as by providing a visual output, an audio output, an adjustment in positioning, and the like. Indeed, the show effect may be selected from a set of different show effects to provide the instructions based on a comparison between the location of the attraction device and a location of the show effect, such as in response to a determination that the location of the attraction device is within a threshold distance of the location of the show effect. Further, the show effect may be controlled to provide the instructions in a manner that is integrated with interactions or effects provided by other show effects in order to maintain an immersive experience for guests. For example, the show effect may be controlled such that the guidance coordinates with actuations of the other show effects to blend the guidance in with other operational control of the attraction system.

In one embodiment, the show effect may be controlled to be moved more proximate to the attraction device in response to detection of the undesirable parameter and prior to providing the instructions. Such control may be performed in order to reduce the distance between the attraction device and the show effect, thereby enabling the show effect to provide the instructions more clearly after being moved more proximate to the attraction device. This may also include positioning a mobile barrier, which may be a part of the show effect, in a manner that discourages movement in an undesired direction (e.g., by blocking a pathway). It should be noted that interaction provided by the show effects may be intentionally repetitive (e.g., repeated audio instructions) to reduce interest and encourage users to move on instead of continuing to interact in the same fashion. Further, interactions may be specifically addressed to users based on user data associated with the attraction device in a database. For example, a user name or other identifier may be announced or displayed to focus the attention of a specific user and further discourage undesired activity, such as by noting that points will be deducted from the specific user's game score based on undesired activity.

In an example, the undesirable parameter may be associated with an undesirable location of the attraction device within the attraction system. For instance, the attraction system may include multiple areas, and each of the areas may be associated with a duration, a time interval, a threshold time, or block of time. Thus, a current time associated with the attraction device being involved in an attraction experience may be monitored, an expected location within the attraction may be determined based on the current time, and a determination may be made that the current location of the attraction device is undesirable based on a mismatch between the expected location and the current location. Therefore, the attraction device and/or the show effect may be controlled to guide the guest to navigate out of the current location, to navigate to the expected location, and the like.

In another example, the undesirable parameter may be associated with an undesirable orientation or operation of the attraction device. Such an undesirable orientation or operation may indicate that the guest is not holding the attraction device properly (e.g., the guest is holding the attraction device upside down), the guest is not using the attraction device properly to interact with show effects (e.g., the guest is not using the attraction device to properly point at a show effect, the guest is not properly actuating the attraction device by pressing a trigger, the guest is not gesturing properly with the attraction device, and so forth). Thus, the attraction device and/or the show effect may be controlled to provide instructions associated with correcting the orientation of the attraction device. This may include a character (e.g., an animated character or an automated figure) presenting an example of how to utilize the attraction device properly. The character may include and/or be presented on a show effect (e.g., of multiple available show effects) that is determined to be proximate and viewable to the appropriate user based on a location of the attraction device. Further, aspects of the character may be controlled based on user data associated with the attraction device. For example, a preferred character for the user may be used for such instructions to encourage interest in the instructions and to otherwise personalize the experience. Further, historical data regarding previously provided instructions may be stored to encourage compliance. For example, a character may refer back to previous instructions provided to the user to assist with the user's understanding of the instructions.

In a further example, the undesirable parameter may be associated with an interaction between the guest and the attraction device, such as based on an actuation of a user interface of the attraction device. In an embodiment, the undesirable interaction may include a quantity of actuations of the user interface (e.g., within a block of time) exceeding or being below a threshold quantity. In an additional or an alternative embodiment, the undesirable interaction may include a time associated with actuation of the user interface, such as to indicate whether the user interface was actuated in response to an aspect of the show effect (e.g., in response to movement of the show effect). In such an embodiment, the time associated with actuation of the user interface may be compared with an expected time, and the undesirable parameter may be determined based on a difference between the times exceeding a threshold difference. In a further embodiment, the undesirable interaction may include an orientation and/or a position of the attraction device during the actuation of the user interface, such as the orientation and/or the position of the attraction device relative to a show effect (e.g., whether the attraction device is pointing at or facing the show effect when the user interface is actuated). The undesirable parameter may therefore be determined based on the orientation and/or the position not matching with an expected orientation and/or position during actuation of the user interface. In any case, the attraction device and/or the show effect may be controlled to instruct the guest to interact with or use the attraction device properly, such as by providing step-by-step instructions regarding proper usage of the attraction device.

Figure 5:
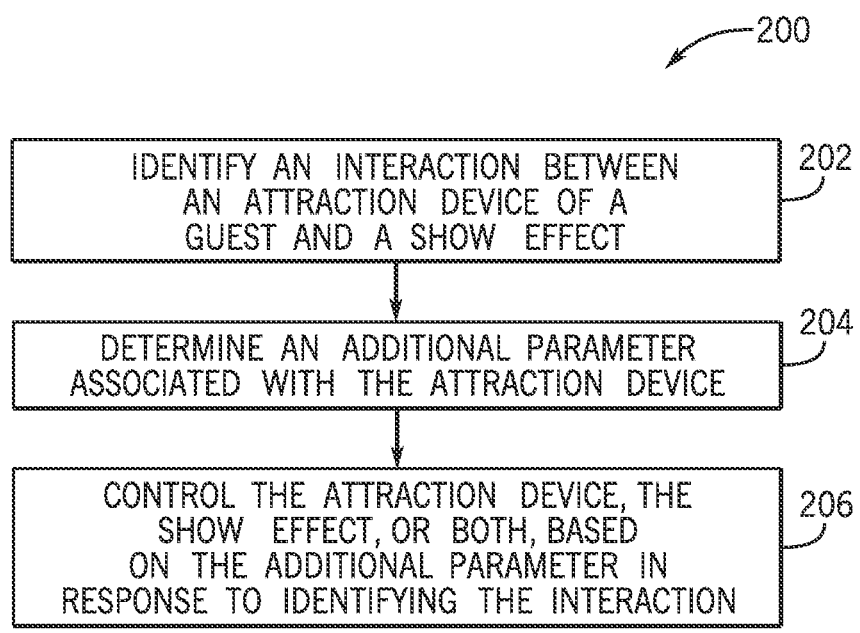
FIG. 5 is a flowchart of an embodiment of a method for controlling an attraction system based on an interaction between a show effect and an attraction device, in accordance with an aspect of the present disclosure.

FIG. 5 is a flowchart of an embodiment of a method 200 for controlling an attraction system. At block 202, an interaction between an attraction device of a guest and a show effect may be identified. For example, sensor data indicative of the interaction may be received. In an embodiment, the sensor data may indicate a physical contact between the attraction device and the show effect, such as a prop. In an additional or an alternative embodiment, the attraction device may output a signal (e.g., upon actuation of a user interface of the attraction device), and the show effect may receive the signal and transmit sensor data indicative of the interaction between the attraction device and the show effect.

At block 204, in response to an identification of an interaction between the show effect and the attraction device, an additional parameter associated with the attraction device may be determined. The additional parameter may include a positioning, such as a location and/or an orientation, of the attraction device (e.g., relative to the show effect) when the user interface is actuated, historical data associated with the attraction device (e.g., previous interactions with the show effect or other show effects), an aspect associated with a user profile of the guest, another suitable parameter, or any combination thereof. Indeed, the additional parameter may be determined via sensor data received from the attraction device (e.g., from the sensor 146 of FIG. 3), information stored within a database (e.g., the database 74 of FIG. 1), another suitable parameter, or any combination thereof. Such parameters may be uniquely associated with the attraction device and/or the guest.

At block 206, the attraction device, the show effect, or both, may be controlled based on the additional parameter determined with respect to block 204 in response to identification of the interaction between the attraction device and the show effect. For instance, the attraction device, the show effect, or both, may be controlled to provide a unique experience to the guest. For instance, the attraction device, the show effect, or both, may be controlled based on an aspect of the guest, such as an identifier associated with the guest. By way of example, the identifier may indicate a historical activity associated with the guest (e.g., a previous experience provided by the attraction system to the guest), preferences indicated by the guest, an accumulated number of points associated with the guest, other suitable parameters associated with the guest, or any combination thereof. The attraction device, the show effect, or both, may therefore be controlled based on a characteristic associated with the guest as indicated by the identifier. In another aspect, the attraction device, the show effect, or both, may be controlled based on an aspect of the attraction device. As an example, based on a determination that the attraction device was used incorrectly (e.g., the positioning of the attraction device is undesirable), the attraction device, the show effect, or both, may be controlled to output an indication that the attraction device was incorrectly used. As another example, based on a determination that the attraction device was previously used incorrectly, but that a most recent usage of the attraction device is correct, the attraction device, the show effect, or both, may be controlled to output an indication that the attraction device is currently being used correctly. In any case, the attraction system may provide a unique and personalized experience for the guest while also providing guidance and encouraging action on the part of the guest to meet expected operational goals.

While only certain features of embodiments of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system, comprising:
   a plurality of show effects;
   a handheld or wearable device; and
   a control system configured to perform operations comprising:
   monitoring a parameter of the handheld or wearable device;
   determining that the parameter is indicative of an undesirable utilization of the attraction system;
   selecting at least one show effect of the plurality of show effects in response to determining that the handheld or wearable device is within a threshold distance of the at least one show effect and based on the determination that the parameter is indicative of the undesirable utilization of the attraction system; and
   controlling the at least one show effect of the plurality of show effects to provide guidance to change the parameter in response to the determination that the parameter is indicative of the undesirable utilization of the attraction system.

2. The attraction system of claim 1, wherein the parameter comprises a current location of the handheld or wearable device, and the control system is configured to determine that the parameter is indicative of a user being in an undesirable location based on comparing the current location of the handheld or wearable device with an expected location.

3. The attraction system of claim 2, wherein the control system is configured to control the at least one show effect to provide a visual output, an audio output, haptic feedback, or any combination thereof, to guide the user out of the undesirable location in response to the determination that the user is in the undesirable location.

4. The attraction system of claim 2, wherein the expected location is a location range.

5. The attraction system of claim 2, comprising a first area and a second area, wherein the expected location is in the second area, the current location is in the first area, and the control system is configured to control the at least one show effect to guide the user from the first area to the second area.

6. The attraction system of claim 2, comprising a plurality of areas, wherein each area of the plurality of areas is associated with a respective block of time, and the control system is configured to determine the expected location of the handheld or wearable device based on a comparison between a current time associated with the handheld or wearable device and the respective block of time.

7. The attraction system of claim 2, wherein the control system is configured to perform operations comprising:
   accessing a respective location associated with each show effect of the plurality of show effects;
   determining that the respective location of the at least one show effect is within the threshold distance of the current location of the handheld or wearable device; and
   controlling the at least one show effect to provide guidance in response to the determination that the respective location of the at least one show effect is within the threshold distance of the current location of the handheld or wearable device.

8. The attraction system of claim 1, wherein the control system is configured to determine that the parameter is indicative of an undesirable usage of the handheld or wearable device.

9. The attraction system of claim 8, wherein the parameter comprises an orientation of the handheld or wearable device, an actuation of a user interface of the handheld or wearable device, or both.

10. The attraction system of claim 8, wherein the control system is configured to control the at least one show effect to provide a visual output, an audio output, haptic feedback, or any combination thereof, to instruct proper usage of the handheld or wearable device in response to the determination that the parameter is indicative of the undesirable usage of the handheld or wearable device.

11. A control system for an attraction system, the control system comprising:
    processing circuitry; and
    a memory comprising instructions, wherein the instructions, when executed by the processing circuitry, are configured to cause the processing circuitry to perform operations comprising:
    identifying an interaction between a handheld or wearable device of the attraction system and a show effect of a plurality of show effects of the attraction system;
    monitoring a parameter of the handheld or wearable device;
    identifying an undesirable interaction between a user and the attraction system based on the parameter;
    selecting the show effect of the plurality of show effects based on the interaction and the undesirable interaction; and
    controlling the show effect to provide guidance to change the parameter associated with the undesirable interaction in response to the identification of the undesirable interaction between the user and the attraction system.

12. The control system of claim 11, wherein the parameter is indicative of a location of the handheld or wearable device, a usage of the handheld or wearable device, or both.

13. The control system of claim 11, wherein the instructions, when executed by the processing circuitry, are configured to cause the processing circuitry to identify the interaction between the handheld or wearable device and the show effect in response to a determination of a physical contact between the handheld or wearable device and the show effect, an actuation of a user interface of the handheld or wearable device, a receipt of a signal by the show effect, or any combination thereof.

14. The control system of claim 11, wherein the instructions, when executed by the processing circuitry, are configured to cause the processing circuitry to control the handheld or wearable device to display text, output spoken words, or both.

15. The control system of claim 11, wherein the show effect is configured to provide the guidance integrated with interactions provided by other show effects of the plurality of show effects.

16. An attraction system, comprising:
a show effect of a plurality of show effects;
a handheld or wearable device; and
a control system configured to perform operations comprising:
identifying an interaction between the handheld or wearable device and the show effect;
detecting an undesirable parameter associated with the handheld or wearable device, wherein the undesirable parameter is indicative of an undesirable location of the handheld or wearable device, an undesirable usage of the handheld or wearable device, or both;
selecting the show effect of the plurality of show effects based on the interaction and detecting the undesirable parameter; and
controlling the show effect to provide guidance to address the undesirable parameter such that the guidance is integrated with effects being provided by other show effects of the plurality of show effects in response to the detection of the undesirable parameter.

17. The attraction system of claim 16, wherein the undesirable parameter comprises a current location of the handheld or wearable device, an orientation of the handheld or wearable device, an actuation of a user interface of the handheld or wearable device, or any combination thereof.

18. The attraction system of claim 16, wherein the control system is configured to perform operations comprising:
controlling the show effect to provide directions out of the undesirable location in response to a detection of the undesirable location of the handheld or wearable device;
controlling the show effect to provide instructions regarding proper usage of the handheld or wearable device in response to a detection of the undesirable usage of the handheld or wearable device; or both.

19. The attraction system of claim 16, wherein the control system is configured to perform operations comprising:
determining an additional parameter associated with the handheld or wearable device in response to identification of the interaction between the handheld or wearable device and the show effect; and
controlling the show effect based on the additional parameter in response to the identification of the interaction between the handheld or wearable device and the show effect.

20. The attraction system of claim 19, wherein the additional parameter comprises historical data associated with the handheld or wearable device, a positioning associated with the handheld or wearable device, an identifier of a user associated with the handheld or wearable device, or any combination thereof.

* * * * *